April 29, 1952     F. I. STEELE     2,594,511
AUTOMATIC LATCHING MECHANISM
Filed Oct. 28, 1948
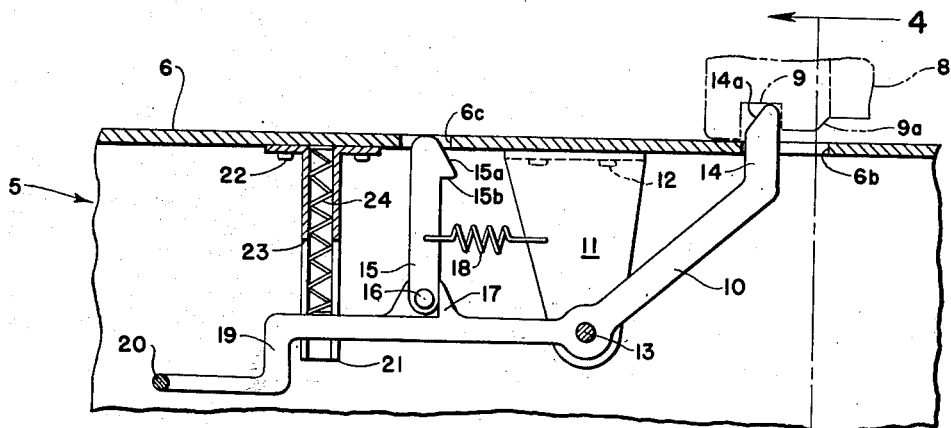
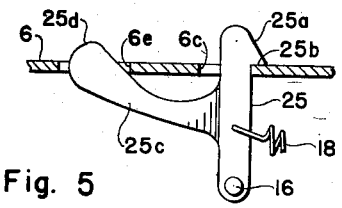
Fig. 5
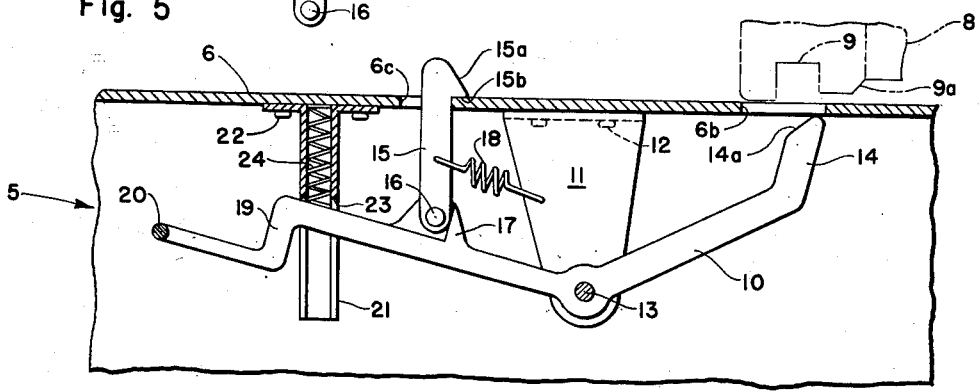
Fig. 3
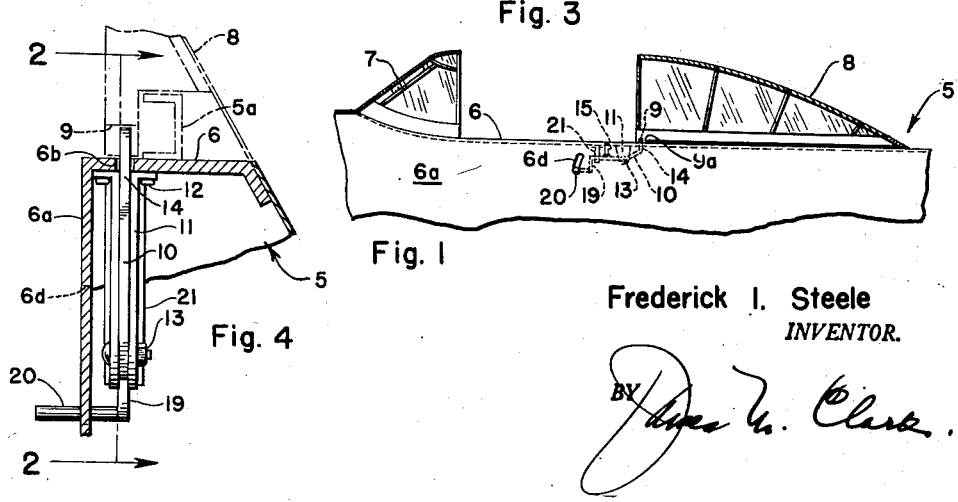
Frederick I. Steele
*INVENTOR.*

Patented Apr. 29, 1952

2,594,511

UNITED STATES PATENT OFFICE 2,594,511

AUTOMATIC LATCHING MECHANISM

Frederick I. Steele, Columbus, Ohio, assignor to Curtiss-Wright Corporation, a corporation of Delaware Application October 28, 1948, Serial No. 57,005

5 Claims. (Cl. 292—336)

The present invention relates generally to safety latching or locking devices and more particularly to improvements in automatically operated safety latching mechanisms for movable canopies, closures, doors and the like.

In the installation and operation of movable closure members, it is frequently desirable that an automatic and positive latch be provided for the closure member in one of its extreme positions from which it may be selectively released and latched out in its released condition until the closure member is moved to a further position at which the latch is automatically tripped and again restored to its operative condition in which it automatically latches the closure member when it is again returned to the same initial position. Such automatic latching mechanism has been found particularly desirable in sliding members used on aircraft such as canopies or enclosures for cockpits and other closures for openings in aircraft bodies.

In landing an aircraft equipped with a sliding cockpit canopy or closure, particularly when landing on the deck of an aircraft carrier, it is desirable to have the closure member open in order to insure maximum visibility. In such carrier landings, the aircraft engages an arresting device and is necessarily decelerated very rapidly and is brought to a sudden stop. This rapid deceleration of the aircraft has caused canopies of aircraft in such landings to slide forward with the possibility of injury to the pilot or other occupants should his head or shoulders be in the path of the forwardly moving canopy. The presently improved latching mechanism has been found particularly satisfactory in such installations and has overcome many of the objectional aspects of the use of closure latches and particularly canopy latches in arresting gear landings.

It is, accordingly, a major object of the present invention to provide improved automatic latching mechanism for movable closure members. It is a further object of this invention to provide an improved mechanism which is more particularly suited for the automatic and positive latching of aircraft closure members in their open position with improved means for manually freeing such latched members when it is desired to return the closure to its other extreme position. It is a further object to provide in such an improved device additional means for automatically bolting or latching out the latching means until the closure has reached a predetermined position at which the latching out means is tripped and the bolt means again made operative or restored for its automatic latching of the closure member. It is a further object of the present invention to provide an improved automatic safety latching arrangement for movable closure members in which the improved mechanism is capable of operating satisfactorily with any of the conventional systems for operating movable closures whether of the manual or power actuated types. It is a corollary objective to provide such improved safety latching means which is capable of operating with power actuating systems utilizing cables, hydraulic means, electric motors or other power sources.

Other objects and advantages of the present invention will become obvious to those skilled in the art after reading the present description, taken together with the accompanying drawings forming a part hereof, in which:

Fig. 1 is a sectional side elevational view of the cockpit of an aircraft showing its canopy in a fully opened position as latched by a form of the improved mechanism;

Fig. 2 is an enlarged sectional elevational view of the improved safety latching mechanism of Fig. 1 as taken along the lines 2—2 of Fig. 4;

Fig. 3 is a view of the same mechanism of Fig. 2 in the released position thereof;

Fig. 4 is a cross-sectional view looking forward as taken along the lines 4—4 of Fig. 2; and Fig. 5 shows a modification of the latch trip of Figs. 2 and 3.

Referring now to Fig. 1, there is shown a side elevational view of the cockpit portion of an airplane having a body portion 5, with the cockpit opening defined by the marginal coaming or sill 6. The forward portion of the cockpit is provided with a conventional sloping windshield member 7 which is usually fixed with respect to the body portion 5 and the remaining aft portion of the cockpit opening is provided with a sliding canopy or closure member 8. The coaming portion 6 is preferably terminated at its inner margin by the cockpit wall 6a and a guide rail or channel track 5a of conventional construction is preferably provided on each sill portion 6, as shown in Fig. 4, along which the rollers or other rail engaging means (not shown) of the sliding canopy 8 may be moved from the open position shown, to its closed position. It will be understood that all of these elements are of otherwise conventional construction and form but one of the many installations with which the improved latching means, to be described hereafter, is adapted to be used. It will also be understood that the movable canopy or closure 8 may be either manually actuated or operated from some suitable hydraulic, electric, mechanical or other power source.

The canopy 8 is shown in Fig. 1 in its extreme aft or rear position in which the cockpit is fully uncovered or opened for purposes of providing maximum visibility to the pilot, or occupant, or to permit ingress to or egress from the cockpit of the aircraft. The canopy 8 is provided adjacent its forward truck portion with a recess 9 forming a keeper or like means engageable by a bolt means such as the terminal 14 of an actuating latching lever 10, 6a pivotally mounted at 13 on the cockpit wall 6a and having a handle portion 20 with biasing means 21 for urging the lever 10 into its latching or locking position. As shown in Fig. 1, the canopy is latched or locked in its rearmost "open" position and the elements in this latched "open" condition are shown enlarged and in greater detail in Fig. 2. In this figure only the forward lower portion of the canopy 8 is shown provided with the downwardly facing truck recess or keeper 9 and an adjacent rearwardly facing cam portion 9a.

The actuating lever 10 is pivotally mounted upon the bracket 11, attached to the sill 6 as by the rivets 12, and this lever is rotatable about the pivot 13. The aft portion of the lever 10 has an angularly disposed terminal which forms the latching or bolt element 14 and is provided with a forwardly facing cam face 14a which is engageable by the cam face 9a of the canopy terminal when the canopy is moved from its closed to its opened position shown in Fig. 2. A dog or tripper hook element 15 having a rearwardly and upwardly facing tapered or cam face 15a, and a detent projection 15b, is pivotally mounted at 16 upon the upwardly extending abutment lug portion 17 formed on the actuating lever 10 forward of the pivot 13. Both the bolt 14 and the dog member 15 are adapted to be alternately projectable through the openings 6b and 6c, respectively, provided within the sill 6 for this purpose. The dog member 15 is attached to the lever 10 by the pivot 16 and is biased by the tension spring 18 attached to the bracket 11 such that the member 15 is continually urged in the clockwise direction about the pivot 16 and against the abutment or stop 17 formed on the mounting lug on the lever 10. The forwardly extending portion of the actuating lever 10 is provided with a downward offset 19 and terminates at its forward terminal in the inwardly directed handle portion 20 which is arranged to move in a limited arcuate path about the pivot 13 and within the slot 6d provided in the cockpit wall 6a, as shown in Figs. 1 and 4.

Between the abutment lug 17 and the offset portion 19 of the actuating lever 10, there is disposed the downwardly extending tubular guide member 21 having its flanged upper terminal fastened to the lower surface of the sill 6 as by the rivets 22. The biasing guide tube 21 is provided with downwardly opening slots 23 within which the forward portion of the lever 10 is arranged to move vertically and is opposed by the compression spring 24 housed within the guide tube 21 and bearing at its opposite terminals upon the lower surface of the sill 6 and the forward portion of the actuating lever 10, which it accordingly biases into the automatic latching condition of the bolt 14 within the keeper 9.

The operation of the improved latching device is as follows: with the canopy 8 latched or locked in its rearmost opened position by engagement of the bolt 14 with the keeper 9, as shown in Fig. 2, the canopy is positively locked and prevented from moving forward either by rapidly decelerated landings or otherwise, by the positive downward pressure exerted by the biasing compression spring 24 maintaining the actuating lever 10 in the latched position shown in this figure. In order that the canopy 8 may be moved forwardly toward or into the closed position of the cockpit, it is first necessary that the bolt 14 be withdrawn by upward manual movement of the handle 20 against the resilient opposition of the biasing spring 24, imparting clockwise movement to the actuating lever 10 about the pivot 13. As this clockwise rotation of the lever occurs, the bolt 14 is withdrawn downwardly from the keeper 9 within the canopy and through the opening 6b, while at the same time the dog 15 is caused to move upwardly through the opening 6c. As this upward movement of the dog 15 continues, its tapered cam face 15a engages the near side of the opening 6c until its detent portion 15b passes through the opening and is caused to be pulled by the spring 18 into engagement with the upper surface of the sill at 6c. Such clockwise movement of the dog 15 about the pivot 16 is permitted by the tilting of the abutment face 17 due to the clockwise rotation of the lever 10 about its pivot 13 as may be seen in Fig. 3. When the handle 20 is released, the detent portion 15b of the dog 15 engages the sill plate 6 and latches the lever 10 to the sill structure in a position in which the bolt 14 has been withdrawn below the sill plate and the hole 6b.

The canopy 8 is now permitted to be moved to its forward or closed position, but in doing so the forward terminal of the canopy will engage the upwardly protruding portion of the dog 15 causing the same to be disengaged from the sill plate 6 and permitted to be withdrawn downwardly through the hole 6c by the compressive force of the biasing spring 24, tending to rotate the lever 10 in the counter-clockwise direction. This movement of lever 10 causes the bolt 14 to again project above the surface of the sill 6 and accordingly to have its automatic operability restored such that as the canopy is again moved to its extreme rearward or open position, the cam face 9a will engage the like face 14a of the keeper 14 to deflect the same downwardly and then back into engagement with the keeper 9; thus causing the bolt 14 to be initially deflected downwardly against the compression of the spring 24 and then to be moved upwardly by the latter into positive locking engagement with the keeper 9 within the canopy. This will again restore the elements to the initial locked open position shown in Fig. 2 in which the dog 15 is maintained below the upper surface of the sill 6. It will be understood that a separate forward latch will preferably be provided for latching the enclosure 8 in its forward or closed position, which could either be a latch of the present type, or a conventional canopy closing latch as presently in use. It should be noted, however, that the danger incurred by undesired or inadvertent movement of a sliding canopy is more likely to be caused by the closing of the canopy upon protruding body portions of the cockpit occupant than would be caused by a canopy which was inadvertently opened, although the presently improved latch is also adapted for canopies or other movable closures to latch the same against movement in either direction.

With the presently improved latching mechanism, when the pilot starts an approach for a landing he merely releases the front lock and pushes the canopy to its rearmost "open" position. As the canopy reaches its full open position it is automatically locked in that position by the engagement of the bolt or latch tongue 14 with the keeper 9 and cannot move forward until it is again manually released by upward movement of the handle 20.

In Fig. 5 there is shown a modified form of the latching out tripper element 15 which provides an additional safety feature and contributes to the foolproof operation of the improved latching mechanism. By reference to this figure, it will be noted that in place of the dog or tripper element 15 the modified element 25, having similar bevel faced and detent hook portions 25a and 25b, has in addition a forwardly extending projection or arm 25c provided with a rounded contact terminal portion 25d. The tripper element 25 is also preferably pivotally mounted as by the pivot 16 and is resiliently drawn rearward by the spring 18, similar to the above mentioned dog element 15. An opening 6e is provided in the sill portion 6 through which the terminal 25d may project in the latched condition of the tripper element as shown in Fig. 5, and the extension arm 25c may be laterally offset to avoid the guide assembly 21.

The use of the trip release extension 25d prevents the operator causing the latch mechanism to be made inoperative in the event that he should lift the handle 20 while the canopy 8 is in its forward or closed position. In the event he inadvertently lifts the handle with the canopy forward and latches out the bolt or tongue 14, the canopy would be prevented from returning to its full rear position and prevented from becoming latched in that position by contact with the forward side of the dog or tripper element 15 of Figs. 2 and 3. However with the tripper release projection 25d in the position shown in Fig. 5, as the rear portion of the canopy strikes this projection, it is caused to deflect downwardly rotating the tripper 25 in the counter-clockwise direction about the pivot 16 out of engagement with the sill 6, thereby releasing the bolt 14 and conditioning or resetting the same to receive the canopy as it reaches its rear position. Accordingly, the use of the improved release extension 25d for the modified form of the tripper or dog element 25 further adds to the safety of the present latching mechanism and constitutes a preferred form of this invention as applied to an aircraft canopy latch mechanism.

Other forms and modifications of the present invention which may occur to those skilled in the art after reading the present description are intended to come within the scope and spirit of this invention as more particularly defined in the appended claims.

I claim:

1. Latching mechanism for a closure movable between open and closed positions along a sill means comprising a bolt member pivotally mounted upon fixed structure engageable with said closure upon manual rotation at a first of said positions, resilient means urging said bolt member into engagement with said closure, trippable detent means pivotally associated with said bolt member arranged upon manual rotation of said bolt member to cause said detent means to engage said sill means and to be positioned in the path of said closure as it is moved to an opposite position, engagement of said closure with said detent means in moving to said opposite position initiating release of said detent means from said sill means and restoration of said bolt means to the influence of said resilient means for permitting re-engagement of said bolt member with said closure upon return of said closure to its first said position, and resetting means including a contact portion movable with and operatively connected to said detent means, said contact portion arranged to be moved into the path of return movement of said closure toward said initial position, said contact portion disposed such that it projects beyond the surface of said sill means in the engaged position of said detent means, said contact portion is arranged in respect to said detent means such that it is initially engageable by said closure upon said return movement for tripping said detent means and causing removal of said detent means under the influence of said resilient means from the path of return movement of said closure to thereby extend and reset said bolt member for re-engagement by said closure at said first position.

2. Latching mechanism for a closure movable along a fixed surface element comprising a lever element pivotally mounted adjacent said surface element, resilient means biasing said lever element into a position in which said lever element engages and latches said closure, a dog element operatively connected to said lever element, spring means connecting said dog element with the pivotal mounting of said lever element biasing said dog element into its surface element engaging position, said dog element having a camming portion fixed thereto projectable through said surface element in the surface engaging position of said dog element at a position on the opposite side of said dog element remote from said lever element latching portion, and means including a recessed frame portion carried by said closure engageable with said camming portion upon return movement of said closure for the release of said dog element and the conditioning of said lever element portion for its engagement with said recessed frame portion and the latching of said closure to said surface element.

3. Latching mechanism for a closure movable along a surface between rearward open and forward closed positions comprising a lever element pivotally mounted to fixed structure adjacent said surface, resilient means biasing said lever element into a position through said surface in which said lever element engages and latches said closure, a dog element operatively connected to said lever element, spring means connecting said dog element with said fixed structure and biasing said dog element into its surface engaging position, said dog element having a camming portion projectable to a position on the closure side of said surface in the surface engaging position of said dog element, means including a recessed frame portion carried by said closure engageable with said projecting camming portion in the rearward opening movement of said closure for the release of said dog element and the conditioning of said lever element portion for the engagement and latching of said opened closure and means for rotating said lever element about said pivotal mounting for the retraction of said lever element latching portion and the release of said closure.

4. Latching mechanism for a closure movable along a surface between opened and closed positions comprising a lever element pivotally mounted adjacent said surface, resilient means biasing said lever into a position projected through said surface in which said lever element engages and latches said closure in its open position, a dog element operatively mounted upon said lever element and arranged for engagement with said surface, spring means connecting said dog element with the pivotal mounting of said lever biasing said dog element into its surface engaging position, said dog element having an integral camming portion projectable through said surface into the path of said closure in the surface engaging position of said dog element between said closed closure and said dog element, and means including a recessed frame portion carried by said closure engageable with said dog element camming portion in the opening movement of said closure toward said open position for the release of said dog element from said surface and the conditioning of said lever portion for the latching engagement of said opened closure.

5. In latching mechanism for a closure movable along an apertured surface element between open and closed positions comprising a lever element pivotally mounted adjacent said surface element, said lever element having a bolt portion projectable through said surface element for the latching of said closure, resilient means biasing said lever element into a position in which said lever element engages and latches said closure, a dog element pivotally mounted upon said lever element engageable with said apertured surface element, and spring means connecting said dog element with said surface element for biasing said dog element into its surface element engaging position, the improvement of camming means carried by said dog element projectable through said surface element in the surface engaging position of said dog element, said closure engageable with said camming means upon movement of said closure, from said closed toward said open position for the release of said dog element and the conditioning of said lever element portion for the latching of said closure at said open position.

FREDERICK I. STEELE.

REFERENCES CITED

The following references are of record in the file of this patent:

UNITED STATES PATENTS

| Number | Name | Date |
| --- | --- | --- |
| 443,356 | Cattley | Dec. 23, 1890 |
| 1,939,051 | Hathorn | Dec. 12, 1933 |